Sept. 19, 1967     P. E. LEWIS ET AL     3,342,925
ARTICULATED CROSSARM ASSEMBLY
Filed April 29, 1966     2 Sheets-Sheet 1
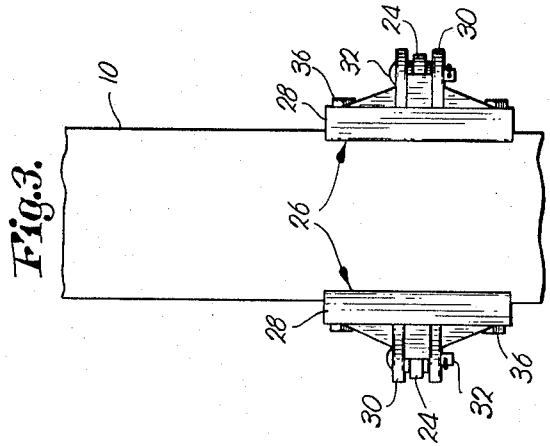
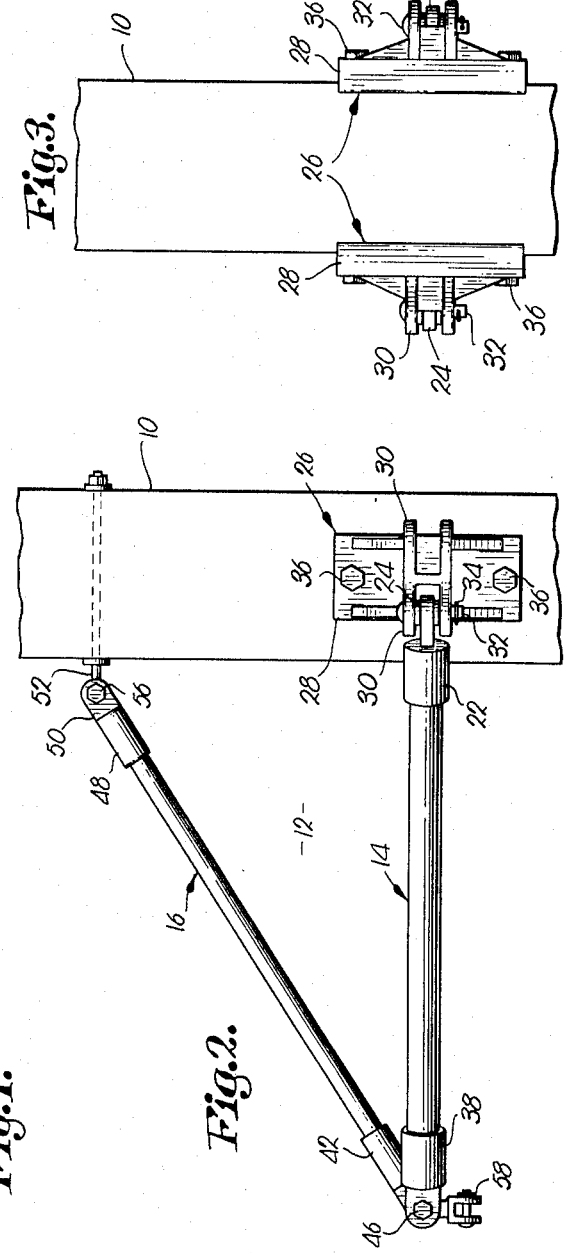
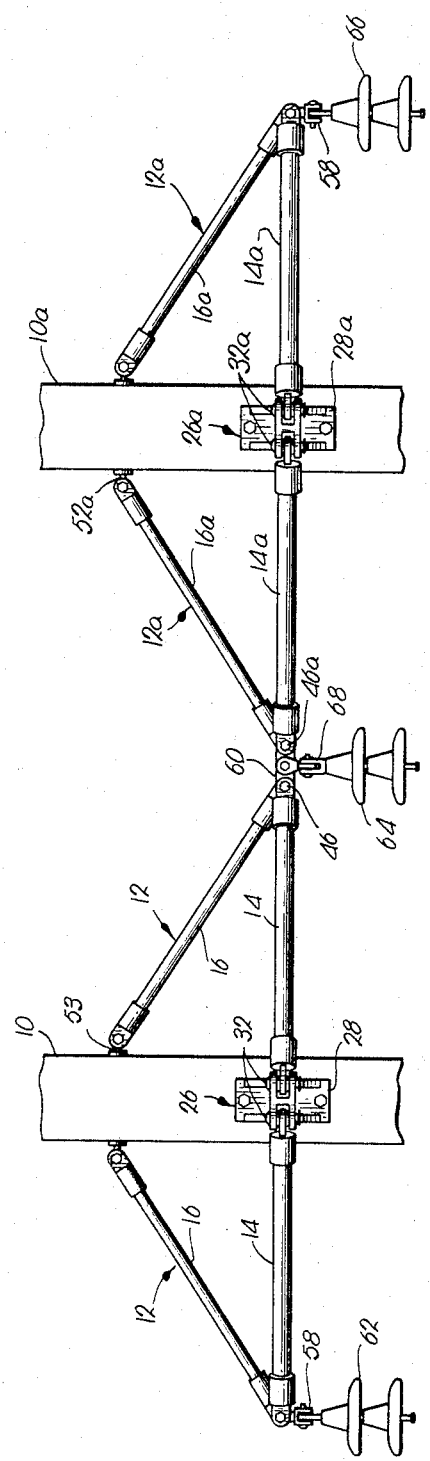
INVENTORS.
Paul E. Lewis
William L. Hollander
BY *Hovey, Schmidt, Johnson & Hovey*
ATTORNEYS.

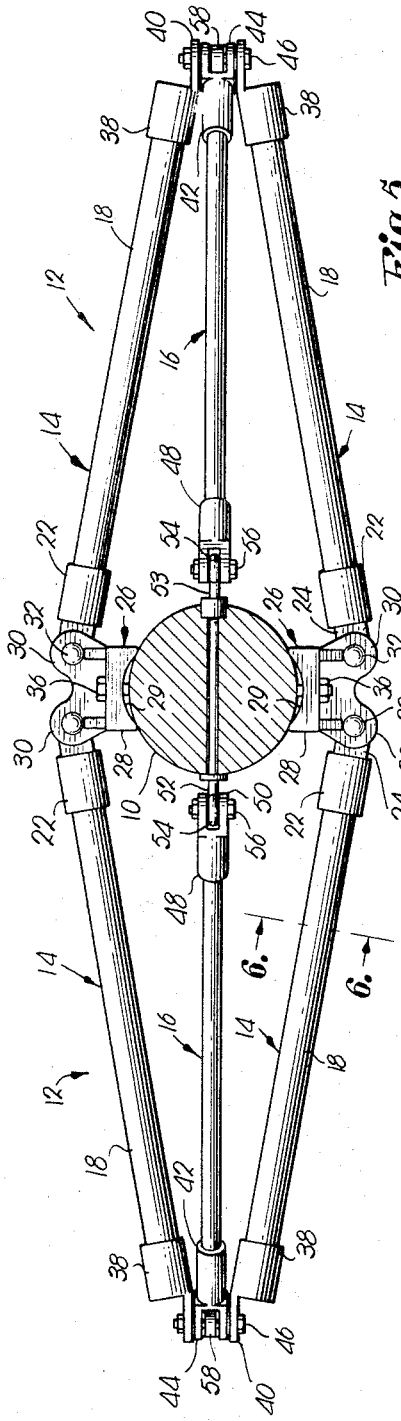

United States Patent Office 3,342,925
Patented Sept. 19, 1967

3,342,925
ARTICULATED CROSSARM ASSEMBLY
Paul E. Lewis, Mexico, and William L. Hollander, Centralia, Mo., assignors to A. B. Chance Company, Centralia, Mo., a corporation of Missouri
Filed Apr. 29, 1966, Ser. No. 546,439
7 Claims. (Cl. 174—45)

ABSTRACT OF THE DISCLOSURE

A three element crossarm array has a pair of horizontal arms and a diagonal member thereabove, the outer ends of the arms and member being interconnected and supporting an insulator string. The inner ends of the horizontal arms are secured to a line pole by vertical pivot pins, the inner end of the diagonal member being secured to the pole by a deformable bolt. The arms and member have elongated body sections composed of fiber glass reinforced, synthetic resin material having inflexible, structurally strong, and superior insulating properties.

The synthetic resin arms and member of the crossarm array have substantially greater strength in tension than in compression. Therefore, a line break could increase the compression load in one of the horizontal arms beyond the load carrying capacity thereof, causing fracture of the one arm. If this should occur, the pivot pin mounting of the other arm and the deformable bolt mounting of the member permit the remaining arm and member to swing about a vertical axis in the direction of the increased load, thereby placing both the remaining arm and the member in tension to preclude further fracture of the array.

---

This invention relates to an articulated crossarm assembly for use in a variety of structural configurations in conjunction with wood line poles or steel tower structures of high voltage transmission line systems.

Crossarm assemblies formed from structural members of fiber glass reinforced, synthetic resin composition present a number of advantages not found in wood or steel crossarms. One advantage lies in the superior insulating properties of the synthetic resin substance as compared with wood, particularly when wet. Steel, of course, offers no insulation whatsoever; therefore, the use of a synthetic resin crossarm reduces right-of-way requirements and the insulator string length at a particular transmission line voltage. Additionally, if a utility desires to raise the voltage of an existing transmission line, it is evident that substitution of synthetic resin crossarms renders upgrading of the lines possible without purchasing additional right-of-way.

A second factor having special importance where transmission lines run through new residential or commercial areas is the improved overhead appearance imparted to the line by synthetic resin crossarm assemblies. The combination of a slimmer, shorter crossarm silhouette, shorter insulator strings, and the use of sky blending exterior colors offers a more aesthetically pleasing appearance to overhead transmission.

Thirdly, with a completely insulated arm, the supporting structure has better working clearances for hot stick crews. Because fewer insulators are needed, maintenance is not required as frequently and insulator strings are handled more easily than the longer strings found on conventional wood arm construction.

Although synthetic resin crossarms have high structural strength, such crossarms have substantially greater strength in tension than in compression. Under conditions of extreme physical stress such as would occur if a line breaks, a fracture of an element of the crossarm assembly bearing a compression load may occur, in which case it is important that the remaining elements of the crossarm array be protected from subjection to compressional forces since the elements then carry an increased load. Furthermore, besides providing such an assembly which is resistant to further damage should one of the elements thereof fracture, it is important from a practical standpoint that the various components of the assembly be designed and interconnected in a manner to facilitate rapid fabrication of a complete supporting structure so that costly installation time may be minimized and less manpower utilized than would normally be required for the assembly of an all wood or all steel structure.

It is, therefore, the primary object of this invention to provide a crossarm assembly as aforesaid of articulated construction which is resistant to further damage in the event that one of the elements thereof should fracture under high physical stress.

As a corollary to the foregoing object, it is an important aim of the instant invention to provide an assembly as aforesaid capable of rapid fabrication with minimum manpower and adaptable to a variety of crossarm configurations depending upon the number of lines of the system and the number of poles provided at each installation.

A specific object of the invention is to provide a three-element crossarm array having a pair of horizontal arms connected to a diagonal member extending from the outer ends of the arms upwardly to the pole, wherein the inner ends of the arms are supported by pivotal mountings secured to the pole which define a vertical pivotal axis through each of said inner ends, and wherein the upper extremity of the diagonal member is secured to the pole by a deformable fastener so that, should one of the arms fracture because of a broken line, the remaining arm will swing in the direction of the pull of the line as the fastener bends to place the remaining arm and the member in tension, thereby resisting further fracture until such time that maintenance crews can replace the damaged arm.

Another specific object is to provide three-element crossarm assemblies which are universally adaptable for utilization alone as a single array, employed as a pair of opposed arrays to provide a double crossarm assembly, or utilized with a pair of line poles to form an H-frame structure having two double crossarms, and to provide mounting hardware for use in conjunction with the structural elements that enables fabrication of the assemblies to form these various structural configurations with a minimum of parts, so that fabrication time is minimized.

In the drawings:

FIGURE 1 is a side elevational view showing four of the three-element arrays of the instant invention utilized in conjunction with two line poles to form an H-frame structure;

FIG. 2 is a side elevational view of one of the three-element arrays as employed in tangent transmission line construction;

FIG. 3 is an end elevation of the structure shown in FIG. 2;

FIG. 4 is a side elevational view showing two of the three-element arrays arranged to form a double crossarm assembly;

FIG. 5 is a plan view of the structure shown in FIG. 4, the line pole being illustrated in cross section; and FIG. 6 is a cross-sectional view through the body of one of the arms taken along line 6—6 of FIG. 5.

Referring initially to FIGS. 4–6, an upright, wood line pole 10 of generally cylindrical configuration is shown having a pair of three-element crossarm arrays 12 secured thereto. Each array 12 is of identical construction and includes a pair of elongated, horizontally extending, juxtaposed arms 14 and an elongated, diagonal member 16.

The main body sections of arms 14 and member 16 are of the same composition as best illustrated by the cross-sectional view of FIG. 6. The elongated body comprises an outer, tubular component 18 having a double wall of fiber glass reinforced, synthetic resin material. Such material should have inflexible, structurally strong and electrically nonconductive properties, and may, as a specific example, comprise fiber glass strands impregnated with and bonded together by an epoxy resin.

The interior of component 18 is filled with a core 20 composed of a solidified, unicellular, thermoplastic or thermosetting synthetic resin foam such as polyethylene foam. These materials are superior to wood in resistance to leakage current tracking, moisture and contamination absorption, other effects of leakage currents, cleaning action and corrosion. Additionally, a strength to weight ratio superior to steel is realized. Details as to the composition and construction of tubular component 18 and core 20, as well as reference to other synthetic resin substances that may be utilized, are contained in Patent No. 2,997,529, granted to Miller H. Fink, on Aug. 22, 1961, and entitled, "Electrical Insulating Rod," owned by the assignee herein.

The inner end of each arm 14 is provided with a metal end fitting 22 in the form of a tubular cap which is telescoped over the synthetic resin body and is provided with an outwardly projecting lug 24. A pair of arm mounts 26 are secured to opposite sides of pole 10 in diametrically opposed relationship, each mount 12 including a baseplate 28 and a pair of clevises 30 integral with the baseplate and projecting outwardly therefrom away from pole 10. Each clevis 30 receives a pivot pin 32 held by a cotter key 34, lugs 24 being apertured to receive respective pivot pins 32 within the associated clevis as illustrated. Spacers or washers are provided on each pivot pin 32 which engage lug 24 within the clevis, thereby maintaining arm 14 in a substantially horizontally extending position during fabrication of the array.

Baseplates 28 have concave inner faces 29, the outer, lateral margins thereof engaging the sides of pole 10 as is clear in FIG. 5. The opposed baseplates are secured to the pole by a pair of nut and bolt assemblies 36 which extend through the pole along vertically spaced diameters thereof and hold the baseplate to the pole by a clamping action.

The outer end of each arm 14 is provided with a metal end fitting 38 having an outwardly projecting lug 40 integral with the edge of the cap portion of fitting 38, as is clear in FIG. 5. Each member 16 is provided with a metal end fitting 42 at its lower extremity having an outwardly projecting, integral clevis 44 disposed between lugs 40 of the associated arms 14. The two arms and the member of each array 12 converge as the outer end of the array is approached; thus, each lug 40 is angularly disposed with respect to the longitudinal axis of the associated arm 14 in order to place the lugs and the clevis 44 therebetween in parallelism for reception of a horizontal crossbolt 46.

As viewed in a vertical plane, each member 16 forms a V-shaped structural configuration with each of the associated arms 14, the upper extremity of member 16 being provided with a metal fitting 48 having an integral clevis 50 projecting therefrom. An eyebolt 52 is utilized to secure the upper extremity of each member 16 to pole 10, bolt 52 having a horizontally extending shank which is inserted through pole 10 and provided with an eye nut 53 on the opposite side of the pole. Bolt 52 and nut 53 are disposed with the axes of opposed eyes 54 extending horizontally, each eye 54 being received by a corresponding clevis 50 and secured thereto by a bolt 56 extending along the axis of the eye.

It will be appreciated that the two arrays 12 shown in FIGS. 4 and 5 form a double cross arm assembly in which the two arrays extend from pole 10 in opposed relationship to one another. The two eye fasteners 52, 53 are located at the same elevation, as are the two mounts 26. The member 16 of each array forms the latter into a symmetrical, three-element arrangement as view in a horizontal plane by virtue of its disposition in a vertical plane bisecting the angle formed by vertical planes passing through the associated arms 14.

A clevis eye coupling 58 depends from each bolt 46 respectively and is carried thereby within the associated clevis 44, couplings 58 serving as a means for attaching insulator strings (not shown in FIGS. 4 and 5) to the two arrays.

A single array 12 is shown in FIGS. 2 and 3 to illustrate the manner in which the array may be utilized alone in tangent construction. It should be noted that the same arm mounts 26 are employed with the single array as with the double cross arm assembly described hereinabove. The unused, right-hand clevis 30 of the mount 26 shown in FIG. 2 remains available in the event that, at a later time, it is desired to increase the number of transmission lines of the system. Additionally, it will be appreciated that vertical stacks of single arrays and double crossarm assemblies may be utilized as need to accommodate the number of lines in the system.

The universal application of the structural components of array 12 is further shown in FIG. 1 where an H-frame structure is illustrated. In this form of the invention, two parallel, upright line poles 10 and 10a are utilized. This arrangement comprises two double crossarm assemblies, the left-hand assembly being composed of a pair of opposed arrays 12 as previously described, while the right-hand assembly is composed of a pair of opposed arrays 12a of the same structural configuration as the left-hand assembly. The right-hand inner array 12 of the left-hand assembly, and the left-hand, inner array 12a of the right-hand assembly are joined at their inner, proximal end portions by a horizontal link 60 carried by adjacent crossbolts 46 and 46a of the two arrays.

In the H-frame structure, three insulator strings 62, 64 and 66 are carried by the crossarm assemblies, strings 62 and 66 being suspended from the outer arrays 12 and 12a respectively by couplings 58. The center string 64 is suspended from link 60 by a coupling 68. In this arrangement, the arm and member elements of the four arrays 12, 12a are all disposed substantially in the vertical plane defined by the parallel poles 10 and 10a.

In utilizing any of the assembly configurations of the invention, conditions of high physical stress may develop which, if severe, could cause one of the arms 14 to fracture. Normally, adequate resistance to fracture is provided by the arrangement of the elements of each array since two arms 14 are provided to bear the compressional stress induced by the weight of the line attached to the insulator string. However, if a fracture of one of the arms 14 should occur, the other, sound arm receives the stresses previously borne by the fractured arm. Therefore, it is requisite that the sound arm be protected from an increase in compressional stress or the danger of further fracture and complete failure of the array will arise.

For purposes of illustration, it is assumed that, in FIG. 5, the upper arm 14 of the left-hand array 12 fractures under a high stress condition caused by a break in the line carried thereby, the pull of the line being in the direction of the upper arm 14 of the damaged array. With the upper arm now broken, the lower arm 14 would be free to swing about its associated pivot pin 32 in a clockwise direction as viewed in FIG. 5 in response to force applied to the outer end of the arm by the line suspended therebeneath, if it were not for the presence of member 16 and the connections of the extremities thereof with the arm and pole 10. However, eyebolt 52 is sized such that, normally the projecting portion of its shank which terminates in eye 54 is rigid with line pole 10 but capable of deformation by bending of the shank should fracture of one of the arms 14 occur due to a break in the line. The shank portion of eye nut 53 is similarly sized. In this manner, development of excessive compressional stresses is precluded since the portion of the shank of eyebolt 52 projecting from the pole will bend under the moment created by the lateral force applied to member 16 by the line, thereby permitting arm 14 to swing through an arc of sufficient length to assure that such remaining arm will be placed in tension only. Thus, complete failure and possible damage to other components of the system is prevented. Ultimately, repair crews reach the site of the damage to replace the fractured arm and repair the broken line.

Having thus described the invention, what is claimed as new and desired to be secured by Letters Patent is:

1. In combination with an upright power line support, a crossarm assembly comprising:
   a pair of elongated, juxtaposed arms extending outwardly from said support in a common, generally horizontally disposed plane, and each having a pair of opposed, inner and outer ends and characterized by substantially greater load carrying capacity in tension than in compression;
   a pair of horizontally spaced arm mounts secured to said support and each having a pivot supporting the inner end of a respective arm and defining a vertical pivotal axis through said inner end;
   an elongated rigid member extending downwardly and outwardly from said support and having a pair of opposed, inner and outer extremities;
   a deformable fastener attaching said inner extremity to said support above said arms at a location on the support lying between a pair of vertical planes extending through respective arms;
   said inner extremity being provided with structure in engagement with said fastener preventing substantial horizontal swinging of the member about the fastener;
   means interconnecting the outer extremity of the member and the outer ends of said arms with said member disposed to form a generally V-shaped structural configuration with each of said arms; and
   means coupled with said outer extremity and said outer ends for suspending a line-supporting insulator string therefrom,
   said fastener deforming in response to lateral forces applied to said member by the line incident to a compressive fracture of one of said arms, whereby to provide a three-element crossarm array which, should said fracture occur as a result of a line break, will swing with the pull of the line as the fastener bends to place the other arm in tension, thereby resisting further fracture.

2. The invention of claim 1,
   said support comprising a generally cylindrical line pole,
   said mounts being disposed on opposite sides of said pole and each including a baseplate secured to said pole and structure projecting outwardly from the baseplate and presenting said pivot thereof, whereby said pivots are spaced outwardly from the pole in opposed relationship to each other so that the mounts may be utilized with poles of different diameters.

3. The invention of claim 1,
   each of said arms and said member including an elongated body section comprising a tubular component of fiber glass reinforced, synthetic resin material having inflexible, structurally strong, and electrically nonconductive properties, and a core within the component of solidified, unicellular, synthetic resin foam.

4. In combination with an upright line pole, a crossarm assembly comprising:
   two pairs of elongated arms, the arms of each pair being in juxtaposition and extending outwardly from said pole in a direction opposite to the other pair with both of said pairs being disposed in a common, generally horizontal plane, each arm having a pair of opposed, inner and outer ends;
   a pair of arm mounts secured to opposite sides of said pole and each having a pair of horizontally spaced pivots, each pivot of each mount supporting the inner end of a respective arm of a corresponding arm pair and defining a vertical pivotal axis through said inner end;
   a pair of opposed, elongated members extending outwardly from said pole and downwardly toward respective arm pairs, and each having a pair of opposed, inner and outer extremities;
   means interconnecting the outer extremity of each member and the outer ends of the associated arm pair with the member disposed to form a generally V-shaped structural configuration with each of the arms to which it is coupled, whereby each member and its associated arm pair form a three-element crossarm array;
   a pair of fasteners attaching respective inner extremities of said members to said pole above said arms at a pair of horizontally spaced locations on the pole each lying between a pair of vertical planes extending through respective arms of the associated array; and
   means coupled with said outer extremity of the member and said outer ends of the arms of each of said arrays respectively for suspending a line-supporting insulator string from each array,
   each fastener being deformable under lateral forces applied to the associated member by the line suspended therefrom incident to a fracture of one of the arms of the respective array whereby, should said fracture occur as a result of a line break, the other arm of the damaged array and the associated member will swing with the pull of the line as the fastener bends to place said other arm in tension, thereby resisting further fracture.

5. The invention of claim 4,
   each of said mounts including a baseplate secured to said pole, a pair of horizontally spaced clevises projecting outwardly from said baseplate, and a pair of vertical pivot pins received by respective clevises, whereby said clevises and pins present said pivots,
   each of said inner ends of the arms being provided with an outwardly projecting lug received by the associated clevis of the corresponding mount and rotatable on the respective pivot pin.

6. In combination with a pair of upright, parallel line poles, a crossarm assembly comprising:
   two pairs of elongated arms extending outwardly from each of said poles respectively in substantially a vertical plane defined by said poles, the arms of each pair being in juxtaposition and extending in a direction opposite to the other pair associated therewith with all of said pairs being disposed in a common, generally horizontal plane, each arm having a pair of opposed, inner and outer ends;
   a pair of arm mounts secured to opposite sides of each of said poles respectively, and each having a pair of horizontally spaced pivots, each pivot of each mount supporting the inner end of a respective arm of a corresponding arm pair and defining a vertical pivotal axis through said inner end;
   a pair of opposed, elongated members extending outwardly from each of said poles respectively in substantially said vertical plane and downwardly toward respective arm pairs, each member having a pair of opposed, inner and outer extremities;
   means interconnecting the outer extremity of each member and the outer ends of the associated arm pair with the member disposed to form a generally V-shaped structural configuration with each of the arms to which it is coupled, whereby each member and its associated arm pair form a three-element crossarm array,
   said interconnecting means including a horizontal link joining the two arrays disposed between said poles to thereby form an H-frame structure;
   four fasteners attaching respective inner extremities of said members to said poles about said common plane, each pair of fasteners associated with a respective pole effecting said attachment at a pair of horizontally spaced locations on the pole, each location lying between a pair of vertical planes extending through respective arms of the associated array;

means coupled with said outer extremity of the member and said outer ends of the arms of each of the two outer arrays respectively for suspending a line-supporting insulator string from each outer array; and means coupled with said link for suspending a line-supporting insulator string therefrom, each fastener being deformable under lateral forces applied to the associated member by the line suspended therefrom incident to a fracture of one of the arms of the respective array whereby, should said fracture occur as a result of a line break, the other arm of the damaged array and the associated member will swing with the pull of the line as the fastener bends to place said other arm in tension, thereby resisting further fracture.

7. In combination with an upright power line support, a crossarm assembly comprising:
- a pair of elongated, juxtaposed arms extending outwardly from said support in a common, generally horizontally disposed plane, and each having a pair of opposed, inner and outer ends;
- a pair of horizontally spaced arm mounts secured to said support and each having a pivot supporting the inner end of a respective arm and defining a vertical pivotal axis through said inner end;
- an elongated member extending downwardly and outwardly from said support and having a pair of opposed, inner and outer extremities;
- a fastener attaching said inner extremity to said support above said arms at a location on the support lying between a pair of vertical planes extending through respective arms;
- means interconnecting the outer extremity of the member and the outer ends of said arms with said member disposed to form a generally V-shaped structural configuration with each of said arms; and
- means coupled with said outer extremity and said outer ends for suspending a line-supporting insulator string therefrom, said fastener being deformable under lateral forces applied to said member by the line incident to a fracture of one of said arms, whereby to provide a three-element crossarm array which, should said fracture occur as a result of a line break, will swing with the pull of the line as the fastener bends to place the other arm in tension, thereby resisting further fracture, the fastener including an eyebolt disposed with the axis of the eye extending generally horizontally, and having a horizontally disposed shank secured to said support and projecting therefrom, said inner extremity of the member being provided with a clevis receiving said eye, and a pin extending through the clevis and the eye along the axis of the latter.

References Cited
UNITED STATES PATENTS
2,689,104  9/1954  Pfaff _____ 248—221 X

FOREIGN PATENTS
374,235  4/1923  Germany.
596,177  4/1934  Germany.

LARAMIE E. ASKIN, *Primary Examiner.*